United States Patent
Sieben et al.

(10) Patent No.: US 6,754,468 B1
(45) Date of Patent: Jun. 22, 2004

(54) LOCAL COMMUNICATIONS DEVICE

(75) Inventors: Ulrich Sieben, Reute (DE); Miodrag Temerinac, Gundelfingen (DE)

(73) Assignee: Micronas Intermetall GmbH, Freiburg (DE)

( * ) Notice: Subject to any disclaimer, the term of this patent is extended or adjusted under 35 U.S.C. 154(b) by 0 days.

(21) Appl. No.: 09/302,391

(22) Filed: Apr. 30, 1999

(30) Foreign Application Priority Data

May 2, 1998 (EP) .............................. 98108028

(51) Int. Cl.$^7$ ............................ H04B 7/00; H04B 1/38; H04H 7/00; H04M 1/00
(52) U.S. Cl. .................. 455/41.2; 455/3.06; 455/550.1; 455/556.1; 455/557
(58) Field of Search .................... 455/3.06, 66, 556, 455/557, 425, 422, 517, 66.1, 3.05, 74, 41.1–41.3, 550.1, 552.1, 553.1, 556.1, 556.2; 379/55.1; 348/723; 725/62

(56) References Cited

U.S. PATENT DOCUMENTS

| | | | |
|---|---|---|---|
| 5,465,401 A | | 11/1995 | Thompson |
| 5,598,407 A | * | 1/1997 | Bud et al. .................. 370/330 |
| 5,671,436 A | * | 9/1997 | Morris et al. .............. 395/800 |
| 5,682,379 A | * | 10/1997 | Mahany et al. ............ 370/311 |
| 5,982,520 A | * | 11/1999 | Weiser et al. .............. 359/172 |
| 6,047,177 A | * | 4/2000 | Wickman .................. 455/422 |
| 6,157,620 A | * | 12/2000 | Danne et al. .............. 370/294 |
| 6,223,029 B1 | * | 4/2001 | Stenman et al. ........... 455/420 |

FOREIGN PATENT DOCUMENTS

| | | |
|---|---|---|
| EP | 760596 A2 | 3/1997 |
| WO | 9713332 | 4/1997 |
| WO | 9810612 | 3/1998 |
| WO | 9811707 | 3/1998 |

* cited by examiner

*Primary Examiner*—William Trost
*Assistant Examiner*—Meless Zewdu
(74) *Attorney, Agent, or Firm*—Duane Morris LLP

(57) ABSTRACT

A Portable communications device (1), particularly as an additional functional unit in a radiotelephone (100), comprising an input, output radio interface (2) for local data exchange between two adjacent communications devices (1; 100) or between a communications device (1; 100) and a data processing device (12) adapted to the local data exchange, or a data-reproducing device (13), or an adapted data source (50). The range (r) of the input/output radio interface (2) is short compared with the range of a conventional radio interface for data :transfer, and corresponds essentially to a talking distance. The communications device (1, 100) further includes a memory device (6) and a data processing device (5). Different data sequences are identified and selectively retrievable in the memory device (6). The activation of the input/output radio interface (2) can be initiated manually.

16 Claims, 2 Drawing Sheets

LOCAL COMMUNICATIONS DEVICE

FIELD OF INVENTION

The present invention relates to communications devices and more particularly to a compact, portable communications device.

BACKGROUND OF INVENTION

Through the spread of new information systems, such as Internet, E-mail, and radiotelephone, which are essentially based on serial data exchange, the need to carry the associated information contents with one as data, even if one is away or meets with acquaintances or friends, increases. The carriers for such data should therefore be easy to take along, and the data thereon should be easy to replace and reproduce. Such a concept, beside the known, publicly accessible communications systems, permits "social broadcasting" at the personal level.

SUMMARY OF THE INVENTION

A portable communications device including: an input/output radio interface, for local data exchange; a data processing device coupled to the radio interface; a memory device coupled to the radio interface; and, means for manually activating the radio interface to send or receive data to be locally exchanged; wherein: a local data exchange takes place between a first communications device and a second apparatus selected from the group consisting of: a second like communications device, a data processing device adapted to the local data exchange, a data-reproducing device, and an adapted data source; a range of the input/output radio interface is short compared with the range of a conventional radio interface for data transfer, and corresponds essentially to a talking distance; the memory device and the data processing device serve to both control and temporarily store and/or process data to be exchanged; and, different data sequences of the local data exchange are identified and selectively retrievable in the memory device.

DETAILED DESCRIPTION OF THE INVENTION

Figure 1:
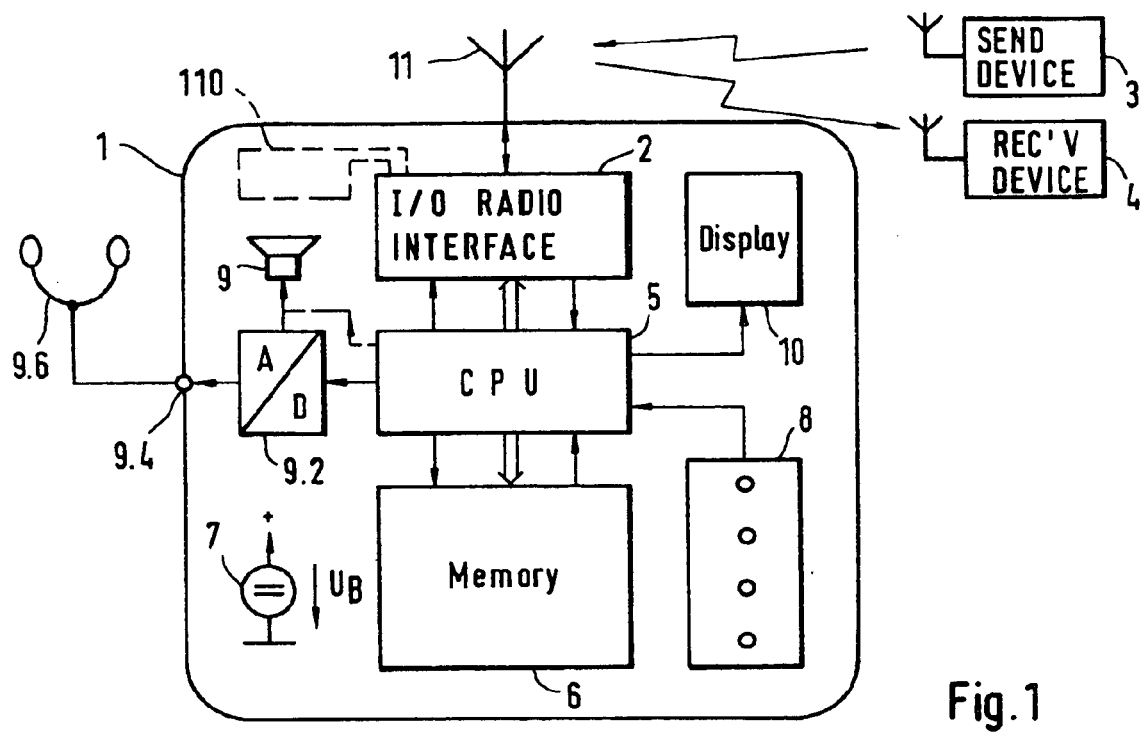
FIG. 1 illustrates a block diagram of the functional units of a communications device with two reproducing devices.

To implement these desirable characteristics, the following technical measures are provided.

small, portable devices which are preferably incorporated in a radiotelephone;

sufficient storage capacities;

a uniform data interface for the reception, exchange, and transfer of data with various contents, such as texts, images, data files, computer programs, audio or video sequences, etc.;

the data interface is implemented by a simple, wireless interface with a very short range; and simple manual control of the device In addition to being us,ed for personal information transfer, such a device, similarly to a diskette, can serve as a data carrier. Furthermore, minor additions will expand the device into a simple sound-reproducing device for stored audio data or permit the visual reproduction or display of graphical or alphanumeric characters or character sequences or even the reproduction of entire video sequences.

The invention thus relates to a communications device for local data exchange via a radio interface which, unlike conventional radio interfaces, has only a very short range. The maximum range corresponds to the usual talking distance between two conversing persons who may also be sitting side by side or opposite each other. Data exchange thus; takes place only within a close spatial compass. The amount of data transmitted, however, can be large if, for example, a music recording or video data are transferred. To achieve acceptable transfer times, the bit rates used for the transfer must be correspondingly high—at least 200 kb/s, preferably in the range of 20 Mb/s. The available infrared transmission systems do not have this capability. Local data exchange is a supplement to personal communication. Just as photographs, pictures, books, diskettes, personal information, etc. are exchanged at a meeting, the invention now permits an exchange of data. It makes no difference whether the data contents consist of PC programs, PC files, audio or video data or other information, because all data can be written in the same digital form into the memory of the communications device and thus be carried along. As a rule, processing or reproduction then takes place at another location using other devices. The communications device also has the capability to communicate with other electronic devices, such as computers, television sets, music systems, etc., via radio interfaces adapted thereto in order to process the data temporarily stored in the communications device or reproduce their respective contents.

The amount of data that may accrue during such a local transfer is large, so that the communications device must be equipped with a large memory. The increasing packing density of solid-state memories, possibly in conjunction with known data reduction techniques, such as the MPEG standards, makes it possible already now to exchange and temporarily store a piece of music of approximately 60 minutes duration. Without the mechanical drive for the storage medium, a flat or compact design, e.g., a notebook-sized device, is possible. The other electronic functional units take up little space as compared with the memory, and serve the purpose of radio transmission, which is initiated manually via a few keys, and to control the overall transmission process. A power source with associated circuitry is also present, of course. A compact communications device can thus be assembled which can be readily carried anywhere.

A big advantage of the short range is that the complexity of the input/output radio interface and the cost of the associated antenna are very low. The transmitting power can be kept so low that stringent radio regulations may not have to be observed. In addition to being suitable for local data exchange, the communications device, as mentioned, may be equipped with reproducing devices which permit at least a simple visual display and/or acoustic reproduction of the received data contents, for example listening in if a piece of music was transferred. The aforementioned combination of such a communications device with a radiotelephone is particularly advantageous, since many users carry the radiotelephone with them anyhow. If the intermediate-frequency range of the radiotelephone, a relatively small range between 25 MHZ and 50 MHZ, currently a range around 40 MHZ, is also used for the radio transmission of the local data exchange, the radiotelephone contains many functional units which can also be used for data transfer. The data are transmitted via the input/output radio interface using conventional digital modulation techniques, such as GMSK, QPSK, CPM, QAM, OFDM, or CDMA. The transmission may also involve the use of methods for encryption and error correction.

The invention and preferred embodiments will now be explained in more detail with reference to the accompanying drawings in which FIG. 1 shows the essential functional units of a communications device 1 in block-diagram form. The block diagram further includes advantageous developments in the form of a sound-reproducing device 9 and a visual display device 10. For local data exchange, an input/output radio interface 2 receives data from an adjacent sending device 3, or sends data to an adjacent receiving device 4, via an external antenna 11 or an internal antenna (not shown), the sending and receiving devices being shown schematically as separate circuit blocks. Control of the local data exchange is effected by a controller such as a suitable programmed microprocessor, which also performs data processing functions and thus represents the essential data processing device 5 in the communications device 1. The data processing device 5 may be incorporated in the input/output radio interface 2. The most space in the communications device 1 is occupied by a memory device 6, which is connected via read, write, and control lines to the data processing device 5. Suitable for this are addressable solid-state memories. As the communications device 1 includes an autonomous power supply 7, the operating conditions for the memory devices 6 are simplified. Manual control of the communications device 1 is effected via few control knows or keys, which are shown schematically as a keypad 8. The manual key functions control the ready-to-transmit state, the ready-to-receive state, and/or auxiliary functions, such as address, index, or encryption inputs.

To make exchanged audio data audible, the communications device 1 advantageously includes the simple reproducing device 9, which is controlled either directly by the data processing device 5 or by a digital-to-analog converter 9.2. If a separate audio output 9.4 is provided for the connection of a high-quality headphone or headset 9.6, then the internal reproducing device 9 is disconnectable.

The communications device 1 of FIG. 1 finally includes the visual display device 10, which serves to display operational data, such as error messages, but which also displays alphanumeric characters which are associated with the transferred data. If the memory device 6 is indexed, then the index directory is retrievable, and the used and/or unused memory area can be indicated, via the display 10.

Figure 2:
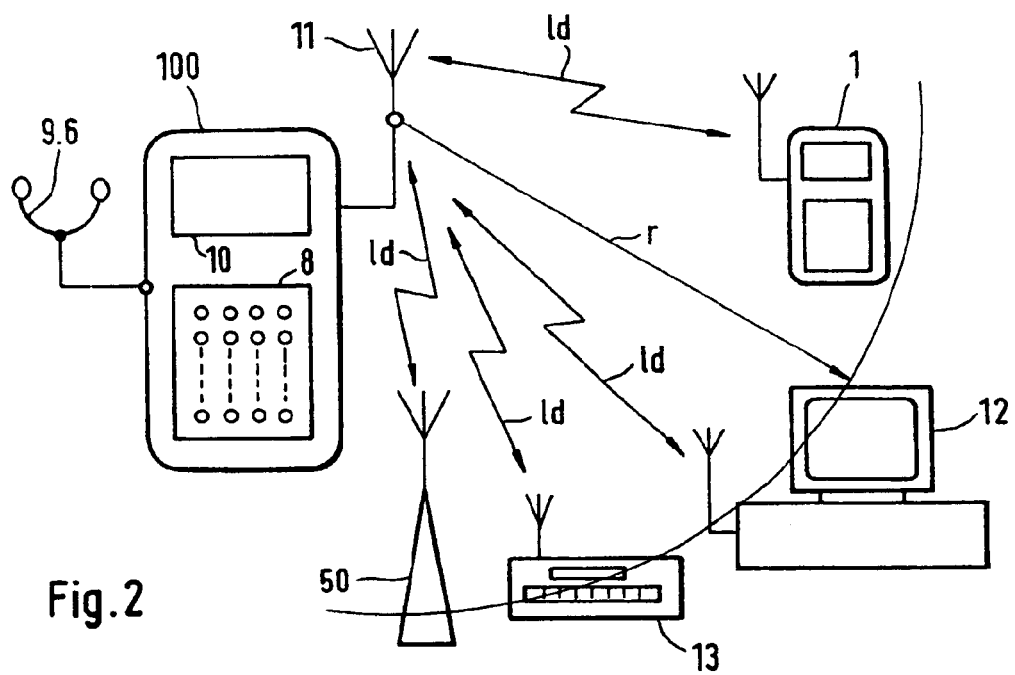
FIG. 2 schematically illustrates a few applications of the local data exchange.

Referring now to FIG. 2, therein is schematically illustrated some applications of the communications device 1 according to the invention, which, as mentioned, may be combined with a radiotelephone 100. Local data exchange ld can take place between two communications devices 1, one or both of which may be suitably adapted radiotelephones 100. However, local data exchange is also possible with a suitably equipped data processing device 12 or data-reproducing device 13, such as a TV set or a CD player. Local data transfer using a data processing device 12 corresponds to an electronic notebook which permits data and programs from another data processing device, for example a workstation, to be taken home by means of the communications device 1 or 100 for further treatment.

The schematic representation of FIG. 2 further includes an adapted data source 50, by which essentially only data are transmitted. It is conceivable that the short range r of the input/output radio interface 2 is used to make the user of the portable communications device 1, 100 go relatively close to the data source 50 in order to be able to receive local data ld. This, in conjunction with a "reward" in the form of a transmitted piece of music, can be utilized for advertising purposes, for example.

The latter application shows that the local data exchange according to the invention allows new and specific forms of communication which are essentially tied to the short range r. The range should preferably not exceed 4 m. The typical operating range should preferably lie between 0 and 2 m. This is a range which is generally covered by a cable. The simple radio link eliminates the need for the otherwise required plugs and the cable, which are cumbersome and sensitive to interference. The communications device 1 thus requires no openings in or passages through the housing; an exception is the headphone connection 9.4, that may be present. The external antenna 11 requires only an antenna insulator which is present in a radiotelephone 100 anyhow, or can be readily replaced by the internal antenna (not shown), whose efficiency need not be high because of the short range. The control of the input/output radio interface 2 in terms of the range r can also be made dependent on the maximum permissible bit error rate such that the transmitting power is manually or automatically reduced as far as possible. This saves battery power and prevents interference with other electronic equipment.

Figure 3:
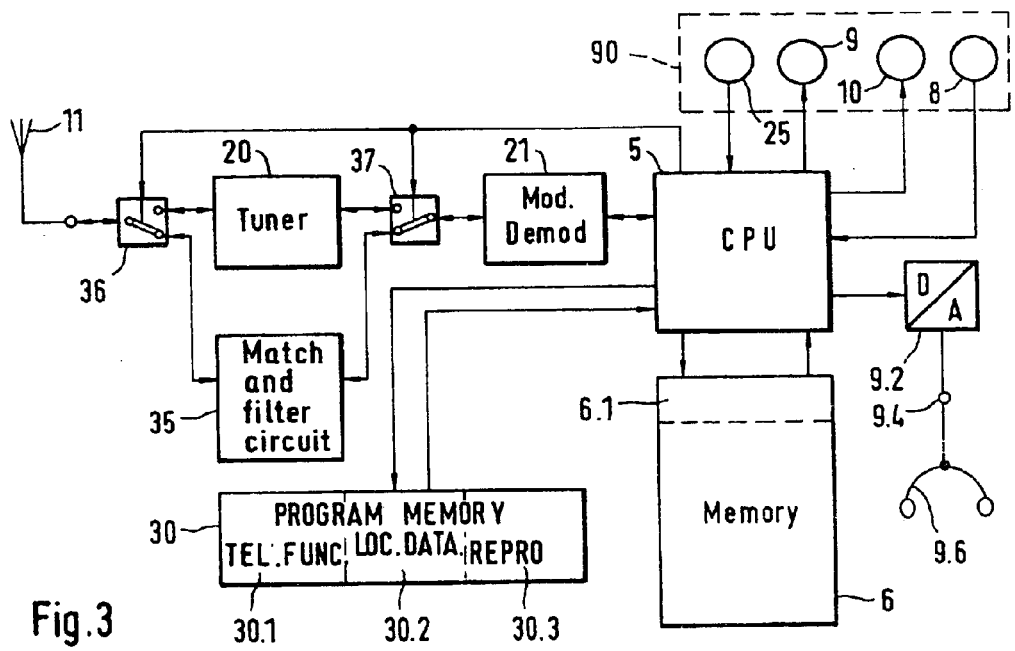
FIG. 3 illustrates a block diagram of a combination of a communications device with a radiotelephone.

The schematic block diagram of FIG. 3 shows the essential functional units which are present in a radiotelephone 100 suitable for local data exchange. The pure radiotelephone function requires the following functional units: an external antenna 11, a radiotelephone tuner 20, an intermediate-frequency processing device 21 with a modulator and demodulator, a data processing device 5, for which a programmable microprocessor is generally used, a memory device 6.1 coupled to the data processing device 5, a program memory 30, a keypad 8, a display device 10, and a simple sound-reproducing device 9. For local data exchange, the memory device 6.1, which has a capacity of approximately 1 Mbyte to 4 Mbytes in the case of a mobile telephone, must be enlarged by at least a factor of 10. The program memory 30 contains a section 30.1 for the pure telephone function, a section 30.2 for local data exchange, and possibly a section 30.3 for reproduction and playback functions. The intermediate-frequency processing device 21, which operates at a clock rate of, e.g., 30 MHZ, can bypass the radiotelephone tuner 20 and effect local data exchange directly as a radio signal source via a matching and filter circuit 35 and the external antenna 11. The two circuit blocks 21, 35 thus correspond to the input/output radio interface 2. The radiotelephone tuner 20 is bypassed by two electronic switches 36 and 37 whose control inputs are controlled by the data processing device 5.

For high-quality audio reproduction via a connected headphone or headset 9.6, as in FIG. 1, a digital-to-analog converter 9.2 is provided which is supplied from the data processing device 5. Any decompression of the MPEG data that may be necessary takes place in the data processing device 5 in connection with the stored compression factors in the program memory 30.3.

Figure 4:
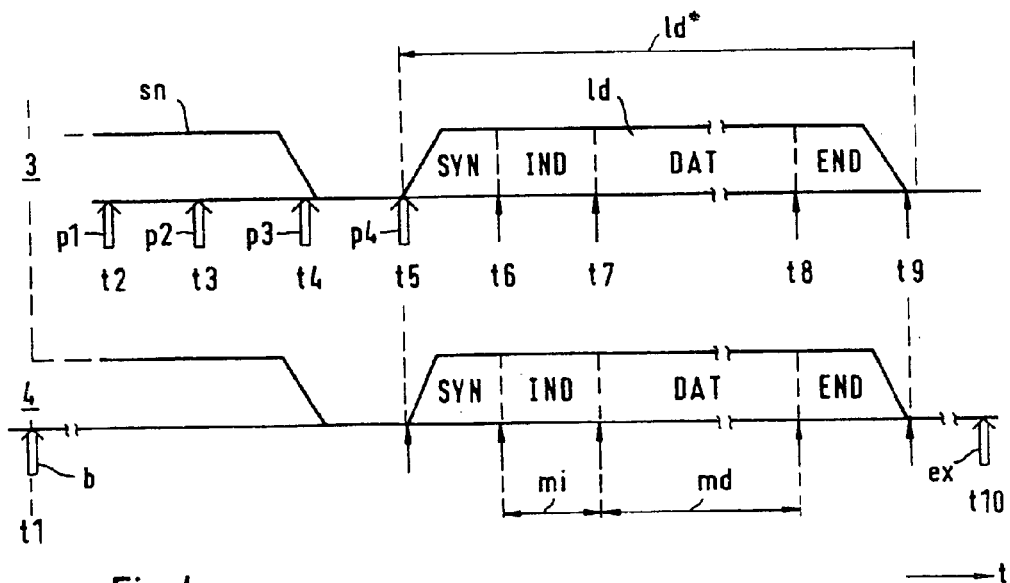
FIG. 4 illustrates a schematic timing diagram of one example of a local data exchange.

FIG. 4 shows schematically the relative timing of a local data exchange ld by the transmission of a data packet ld*. The upper line corresponds to the processes at the sending end 3, and the lower line to the processes at the receiving end 4. It will be assumed that two persons are meeting who want to exchange data. For simplicity, they and the associated communications devices will be referred to as the sending end 3 and receiving end 4, respectively. After a mutual agreement that local data ld are to be exchanged, the receiving end 4, at the instant t1, switches to the ready-to-receive state by a manual start input b. The receiving end 4 now waits for a sync signal SYN to be received which corresponds to a predetermined data sequence contained in a sync field of the transmitted data packet ld*. According to the agreement made, the transmission process was initiated manually at the sending end 3 at approximately the same time. It begins by the communications device 1 at the sending end 3 automatically switching to receive and starting, at the instant t2, a first check p1 to determine whether an interference signal sn is present. This check is repeated after short intervals at the instants t3 to t5 (cf. checks p1 to p4) until the interference signal sn is no longer detectable; that is the case at the instant t5. If the interference continues for a longer time, the attempt to transmit will be interrupted and an error message will be displayed. After a personal, agreement, the local data transfer can then be attempted at another point.

If the conditions for transmission are favorable, the sending end 3 switches to transmit at the instant t5 and sends a data packet ld*, which begins with the sync signal SYN (instants t5 t6), which is followed by a control field IND (instants t6, t7), which contains address, index, encryption, or other information of a superordinate nature. The next field DAT (instants t7, t8) of the data packet ld* is the data field proper, which contains the data ld to be transferred. The end is formed by an end signal END (instants t8, t9) whose predetermined data sequence terminates the data storage at the receiving end 4 at the instant t9. Since the control field IND generally contains information which is important for the transferred data Id and which relates, for example, to the compression, the contents of the control field IND or a part thereof will be stored independently of the transferred data ld, cf. the separate storage processes mi, md in FIG. 4.

If the local data transfer is improved by an error-checking code, it is advantageous to provide after the transfer, i.e., approximately at the instant t9, an acknowledgment or error indication at the receiving end 4. In the event of an erroneous or uncorrectable transfer, the transfer will simply be repeated by mutual agreement. An important criterion for this is the maximum permissible bit error rate, which, as mentioned, can also be used to control the transmitting power. After la successful data transfer, the ready-to-receive state is switched off at the receiving end 4 by a manual switch-off input ex at the instant t10.

The processes at the sending end 3 and receiving end 4 are similar if one of the two devices is an adapted processing device 12, a data-reproducing device 13, or an adapted data source 50. A detailed description is therefore unnecessary.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A portable communication device operable as a functional unit in a radiotelephone for local data exchange, wherein, the local data exchange operating in a frequency range of 25–50 MHz takes place between two adjacent communications devices or between a communications device and a data processing device adapted to the local data exchange, or a data-reproducing device or an adapted data source over a range (r) within approximately 4 meters, and determined based on a maximum permissible bit error rate serving as a determination criterion, comprising;

an input/output radio interface;

coupled to the input/output radio interface are a memory device and a data processing device which serve to both control and temporarily store and/or process the data to be exchanged, wherein different data sequences of the local data exchange are identified and selectively retrievable in the memory device; and the activation of the input/output radio interface for sending or receiving data to be exchanged can be initiated manually.

2. The communications device as claimed in claim 1, wherein by means of the local data exchange, audio data, text data, video data, computer programs, computer or other files are exchanged.

3. A communications device as claimed in claim 1, wherein contents of the exchanged data are reproduced at least partly in visual and/or audible form by means of a reproducing device incorporated in the communications device.

4. A communications device as claimed in claim 1, wherein the exchanged data are encrypted at the sending end and decrypted at the receiving end by means of the data processing device.

5. A communications device as claimed in claim 4, wherein a key can be entered manually at the sending and receiving ends.

6. A communications device as claimed in claim 1, wherein if the communications device is combined with the radiotelephone, some functional units of the radiotelephone are also use for local data exchange.

7. A communications device as claimed in claim 1, wherein the input/output radio interface, is coupled to an error-detection facility and/or an error-correction facility in the, data processing device.

8. A portable communications device comprising:

a radio interface adapted to transmit and receive data over a distance within approximately 4 meters determined based on a maximum permissible bit error rate serving as a determination criterion, operable in a frequency range between 25 MHZ and 50 MHZ;

a data processing device coupled to said radio interface and being adapted to process data to be transmitted or received;

a memory device coupled to said data processing device and being adapted to temporarily store data to be transmitted and data which has been received; and means for manually activating the radio interface to transmit or receive data;

wherein, when said radio interface transmits or receives data, a local data exchange takes place between said radio interface and a second device selected from the group consisting of: a second like communications device, a data processing device adapted to the local data exchange, a data-reproducing device and an adapted data source; and different data sequences associated with a local data exchange are individually identifiable and selectively retrievable in the memory device.

9. The communications device of claim 8, wherein data to be exchanged by a local data exchange is selected from the group consisting of:

audio data, text data, video data, computer programs and computer files.

10. The communications device of claim 8, further comprising means for visually reproducing data and means for audibly reproducing data, wherein contents of locally exchanged data are reproduced at least partly in visual or audible form by said visual reproduction means or said audible reproduction means, respectively.

11. The communications device of claim 8, wherein said data processing device is further adapted to encrypt or decrypt data associated with a local data exchange.

12. The communications device of claim, 11, wherein an encryption/decryption key can be entered manually.

13. The communications device of claim 8, wherein said communications device is integrated with the radiotelephone, and at least one functional portion of the radiotelephone is utilized for local data exchange.

14. The communications device of claim 8, further comprising means for error-detection and error-connection.

15. A portable wireless telephone comprising:

a radio interface adapted to transmit and receive data over a predetermined range being equal to or less than approximately 4 meters determined based on a maximum permissible bit error rate serving as a determination criterion;

a data processing device coupled to said radio interface and being adapted to process data to be transmitted and data received;

a memory device coupled to said data processing device and being adapted to temporarily store data to be transmitted and data received; and means for manually activating the radio interface to send or receive data;

wherein, when said radio interface, operating in a frequency range of 25–50 MHz transmits or receives data, a local data exchange takes place between said radio interface and a second device selected from the group consisting of: a second like communications device, a data processing device adapted to the local data exchange, a data-reproducing device, and a data source; and different data sequences associated with said local data exchange are individually identifiable and selectively retrievable from the memory device.

16. A portable wireless telephone comprising:

a radio interface operable in a frequency range between 25 MHZ and 50 MHZ to transmit and receive data over a range within substantially 4 meters determined based on a maximum permissible bit error rate serving as a determination criterion;

a data processing device coupled to said radio interface and to process data to be transmitted and data received;

a memory device coupled to said data processing device and to temporarily store data to be transmitted and data received; and wherein, when said radio interface transmits or receives data, a data exchange takes place between said radio interface and a second device using a data sequence associated with said data exchange, individually identifiable and selectively retrievable from the memory device selected from the group consisting of: a second like communications device, a data processing device adapted to said data exchange, a data-reproducing device, and a data source.

* * * * *